United States Patent
Morishima

[11] Patent Number: 5,633,808
[45] Date of Patent: May 27, 1997

[54] DIGITAL SIGNAL PROCESSOR

[75] Inventor: Morito Morishima, Hamamatsu, Japan

[73] Assignee: Yamaha Corporation, Hamamatsu, Japan

[21] Appl. No.: 674,216

[22] Filed: Jul. 1, 1996

Related U.S. Application Data

[63] Continuation of Ser. No. 105,409, Aug. 11, 1993, abandoned.

[30] Foreign Application Priority Data

Aug. 13, 1992 [JP] Japan .................... 4-216203

[51] Int. Cl.$^6$ .................................... G06F 15/76
[52] U.S. Cl. ................ 364/491; 364/716; 395/800
[58] Field of Search ........................ 364/517, 488–491, 364/716, 736; 395/280, 311, 312, 775, 800

[56] References Cited

U.S. PATENT DOCUMENTS

| | | |
|---|---|---|
| 4,689,738 | 8/1987 | van Wijk et al. |
| 4,718,057 | 1/1988 | Venkitakrishnan et al. ............. 370/55 |
| 5,179,530 | 1/1993 | Genusov et al. ........................ 364/726 |
| 5,239,654 | 8/1993 | Ing-Simmons et al. ................. 395/800 |
| 5,361,367 | 11/1994 | Fijany et al. ............................ 395/800 |

FOREIGN PATENT DOCUMENTS 1-116730  5/1989  Japan .

Primary Examiner—Emanuel T. Voeltz
Assistant Examiner—Edward J. Pipala
Attorney, Agent, or Firm—Loeb & Loeb LLP

[57] ABSTRACT

A digital signal processor is mainly configured by a parallel-processing unit, a plurality of memory portions and a micro-code producing portion. Each of the memory portions accompanies with an input circuit and an output circuit, while the parallel-processing unit contains a plurality of operating elements such as multipliers, adders and the like. An interconnection manner among the operating elements is changed responsive to the micro code so as to embody a desired configuration by which a desired parallel processing can be carried out. One of the micro codes is selected in accordance with an operational result of the parallel-processing unit, so that the micro code to be supplied to the parallel-processing unit can be changed by one sampling period. In accordance with the micro code, data is read from a desired memory portion so that the read data is supplied to a desired operating element, while the operational result obtained from each operating element is written into a desired memory portion. Preferably, the parallel-processing unit is configured by an arithmetic and logic unit (ALU) and/or a programmable logic array.

7 Claims, 9 Drawing Sheets

DIGITAL SIGNAL PROCESSOR

This is a continuation of application Ser. No. 08/105,409, filed Aug. 11, 1993, now abandoned.

BACKGROUND OF THE INVENTION

1. Field of the Invention

The present invention relates to a digital signal processor which performs several kinds of signal processings on digital signals.

2. Prior Art

In the fields of the communication system, sound processing system and the like, a digital signal processor (i.e., DSP) is used when performing several kinds off signal processings on the digital signals inputted thereto. Every time a new sample of digital signal to be processed is entered, the DSP performs a plurality of arithmetic and logical operations on the basis of parameters. The parameters are determined responsive to a predetermined number of the samples which are previously inputted to the DSP, or they are determined responsive to results of operations which were previously carried out. For this reason, an extremely high performance is required for the DSP when performing the above-mentioned signal processings. Conventionally, several kinds of hardware configurations are studied in order to carry out a large scale and complicated signal processing.

Accompanied with a recent progress of the semiconductor manufacturing techniques or an improvement in the design of the hardware configuration for the semiconductor devices, some DSP can carry out a high-speed signal processing. However, the DSP is designed as the processor of which fundamental configuration is based on the von Neumann architecture of the general-use computer system. In such processor, the instructions are sequentially carried out step by step in a predetermined period. Thus, the time required for performing the signal processing in the DSP should be determined responsive to a number of operation steps included in the signal processing to be carried out. This causes a drawback in that a processing speed must be limited when performing a large-scale and complicated signal processing.

SUMMARY OF THE INVENTION

It is accordingly a primary object of the present invention to provide a digital signal processor which can carry out the signal processing at a high speed by simultaneously carrying out plural kinds of operations in parallel.

According to a fundamental configuration of the digital signal processor as defined by the present invention, there are provided a plurality of operating elements, a plurality of memory portions, input circuits, output circuits and a micro-code producing portion. In accordance with output select information, each of the output circuits supplies data, which is read from each of the memory portions, to each of the operating elements. In accordance with input select information, each of the input circuits supplies an operational result of the operating element to each of the memory portions. The micro-code producing portion produces a micro code which contains the input select information, output select information and a writing address and a reading address for each of the memory portions. On the basis of the operational result of the operating element, the micro code to be produced from the micro-code producing portion is changed.

In accordance with the micro code, a connection is established between each operating element and each memory portion. Thus, the operating elements perform their operations in parallel on the data which are respectively read from the memory portions connected thereto. Then, the operational result of each operating element is supplied to and stored in the memory portion which is selected by the micro code. Incidentally, a decision branching in an algorithm of the parallel processing can be performed by changing the micro code on the basis of the operational result of the operating element.

BRIEF DESCRIPTION OF THE DRAWINGS

Further objects and advantages of the present invention will be apparent from the following description, reference being had to the accompanying drawings wherein the preferred embodiment of the present invention is clearly shown.

In the drawings.

DESCRIPTION OF THE PREFERRED EMBODIMENT

Figure 1:
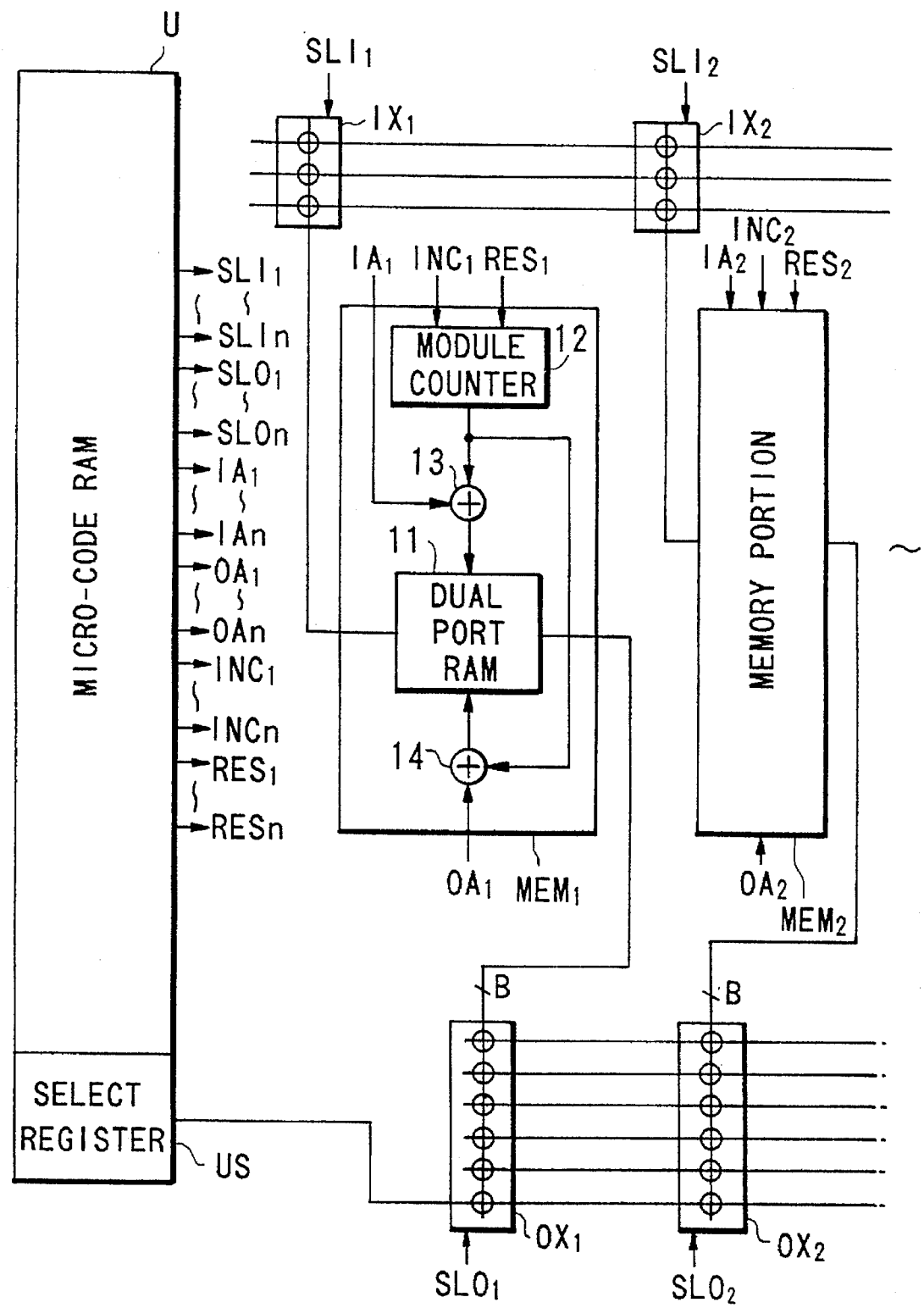
FIG. 1 is a block diagram showing an electronic configuration of an essential part of the digital signal processor according to an embodiment of the present invention.

Now, a digital signal processor according to an embodiment of the present invention will be described in detail by referring to the drawings, wherein parts identical to those shown in several drawings are designated by the same numerals.

[A] Configuration of DSP

Figure 2:
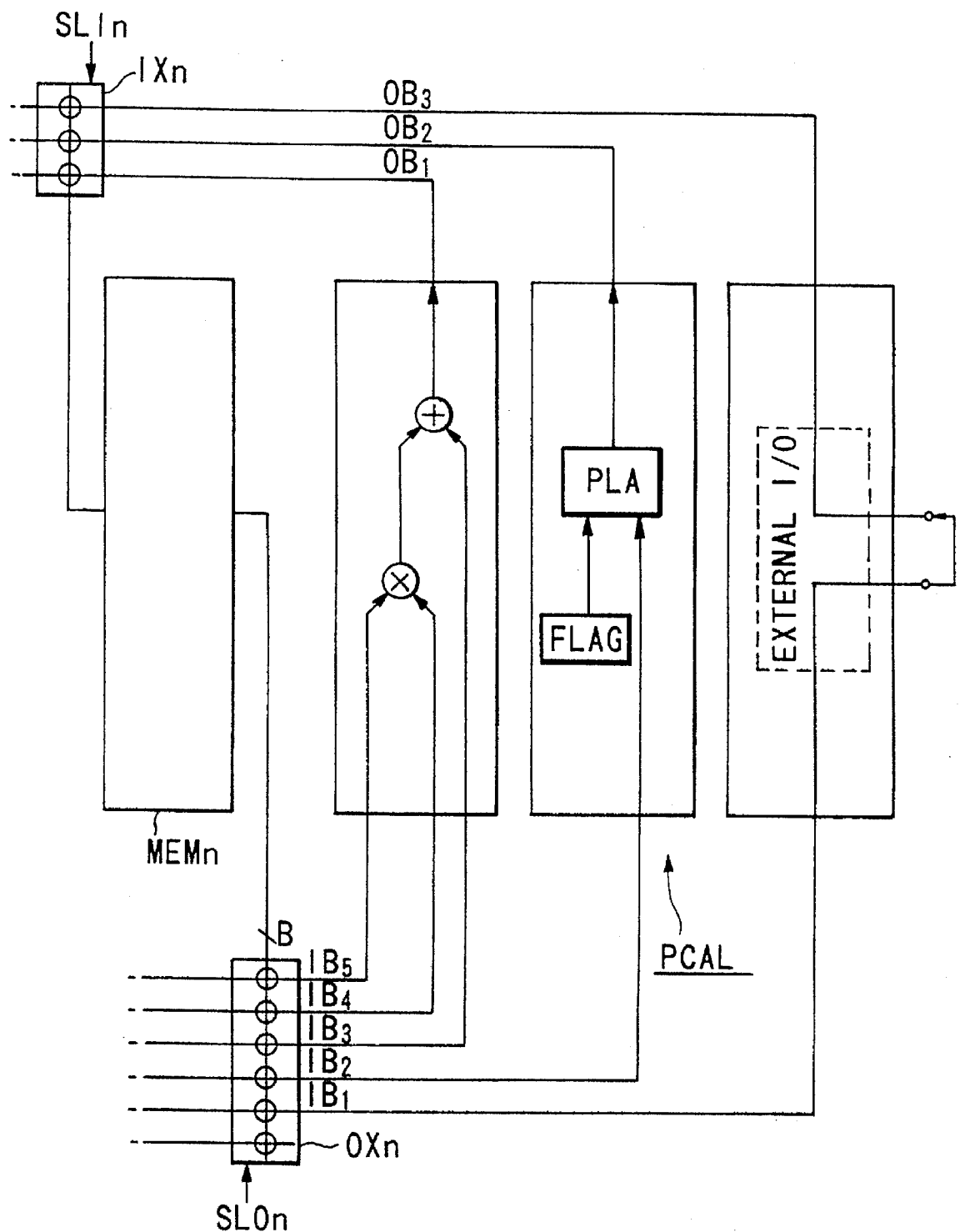
FIG. 2 is a block diagram showing another part of the digital signal processor including a first example of a parallel-processing unit.

FIGS. 1 and 2 are block diagrams showing an electronic configuration of the DSP according to an embodiment of the present invention. In FIGS. 1 and 2, a symbol U designates a micro-code random-access memory (i.e., a micro-code RAM) which stores micro codes corresponding to several kinds of signal processings. In the present embodiment, the micro code consists of several kinds of control information which are required for performing an objective signal processing. More specifically, the micro codes contain input select information $SLI1$ to $SLIn$, output select information $SLO1$ to $SLOn$, input addresses $IA1$ to $IAn$, output addresses $OA1$ to $OAn$, increment signals $INC1$ to $INCn$ and reset signals $RES1$ to $RESn$. Herein, a set of the input address, output address, increment signal and reset signal is supplied to each of memory portions MEM1 to MEMn. Incidentally, the function of each control information will be described later when describing each part of the DSP.

Next, a symbol US designates a select register. Information to be written is supplied to the select register US by means of output switching circuits OX1 to OXn which will be described later. The data which is set in the select register US is decoded to produce an address. Then, the micro code is read from the storage area, corresponding to the produced address, in the micro-code RAM U.

Among the memory portions MEM1 to MEMn, the memory portion MEM1 is configured by a dual-port RAM 11, a module counter 12, adders 13 and 14. The dual port RAM 11 has two address terminals to which address signals outputted from the adders 13 and 14 are respectively supplied. Hence, a writing operation or a reading operation is performed in response to the address signal with respect to a predetermined area of the dual-port RAM 11. The module counter 12 changes its count value within a predetermined range, of which maximum value is smaller than a number of addresses provided in the dual-port RAM 11. So, the module counter 12 repeats counting the value within the predetermined range. In the present embodiment, programs describing the signal processing is divided into a plurality of functional units each executing a specified function, so that the term "module" corresponds to the functional unit. The module counter 12 functions to indicate one of the functional units which is currently executed. The other memory portions MEM2 to MEMn have the similar configuration of the memory portion MEM1. These memory portions MEM1 to MEMn are used for performing a delay operation, temporarily storing an intermediate result of the signal processing and temporarily storing the control information regarding to the signal processing to be performed. One of the memory portions is used as an input interface to which the information is inputted by means of an external I/O interface, while another one is used as an output interface from which the information is outputted by means of an external I/O interface. The memory portions MEM1 to MEMn respectively receive the input addresses IA1 to IAn, output addresses OA1 to OAn, increment signals INC1 to INCh and reset signals RES1 to RESn.

A first example of a parallel-processing unit PCAL shown in FIG. 2 provides a plurality of input ports, output ports and operating elements. As the operating elements, it is possible to employ multipliers, adders, a programmable logic array (PLA), an arithmetic and logic unit (ALU) and the like. Herein, the PLA can be used with the memory portion MEM, wherein the PLA is used as a so-called state machine. Based on the result of the operation performed by the PLA, it is possible to change over the micro code. Other than the above-mentioned operating elements, the parallel-processing unit PCAL can provide a flag register and an external I/O interface. Information representing an operational result of the multiplier or of the ALU is set to the flag register. Upon the receipt of the input data, the operating elements in the parallel-processing unit PCAL respectively carry out the operational processes in parallel.

Symbols IB1 to IBm designate input data buses, each of which is provided for each of the input ports of the parallel-processing unit PCAL. Each of the buses IB1 to IBm has a width corresponding to a predetermined size of data to be transferred therethrough. On the other hand, symbols OB1 to OBm designate output data buses, each of which is provided for each of the output ports of the parallel-processing unit PCAL. Each of the buses OB1 to OBm has a width corresponding to a predetermined size of data to be transferred therethrough.

Symbols IX1 to IXn designate input switching circuits, each of which is provided for each of the memory portions MEM1 to MEMn. The input select information SLI1 to SLIn, each of which occupies a part of the micro code, are respectively supplied to the input switching circuits IX1 to IXn. Each input switching circuit IXi (where i=1 to n) connects one of the output data buses OB1 to OBm, which is designated by the input select information SLIi, to each memory portion MEMi. In some cases, a data-input-disable instruction is produced as the input select information. In the input switching circuit which receives the data-input-disable instruction, none of the output data buses are selected, resulting that no input data is supplied to the memory portion corresponding to that input switching circuit. In this case, a data writing operation is intentionally prohibited on the dual-port RAM in the memory portion.

Meanwhile, symbols OX1 to OXn designate output switching circuits, each of which is provided for each of the memory portions MEM1 to MEMn. The output select information SLO1 to SLOn, each of which occupies a part of the micro code, are respectively supplied to the output switching circuits OX1 to OXn. Under the operation of each output switching circuit OXi (where i=1 to n), one of the input data buses IB1 to IBm and an input line of the select register US which is designated by the output select information SLOi is connected to an output terminal of each memory portion MEMi from which its read data is outputted. In the present embodiment, however, one or more output destinations can be selected by each of the output switching circuits OX1 to OXn, so that each of the memory portions can deliver its output data to a plurality of output destinations. For this reason, by using plural operating elements of the parallel-processing portion PCAL, it is possible to simultaneously perform plural operational processes on the same data in parallel. In some cases, a data-output-disable instruction is supplied to each of the output switching circuits OX1 to OXn as the output select information. In this case, the data read from the corresponding memory portion is prohibited from being supplied to the other circuit.

Figure 3:
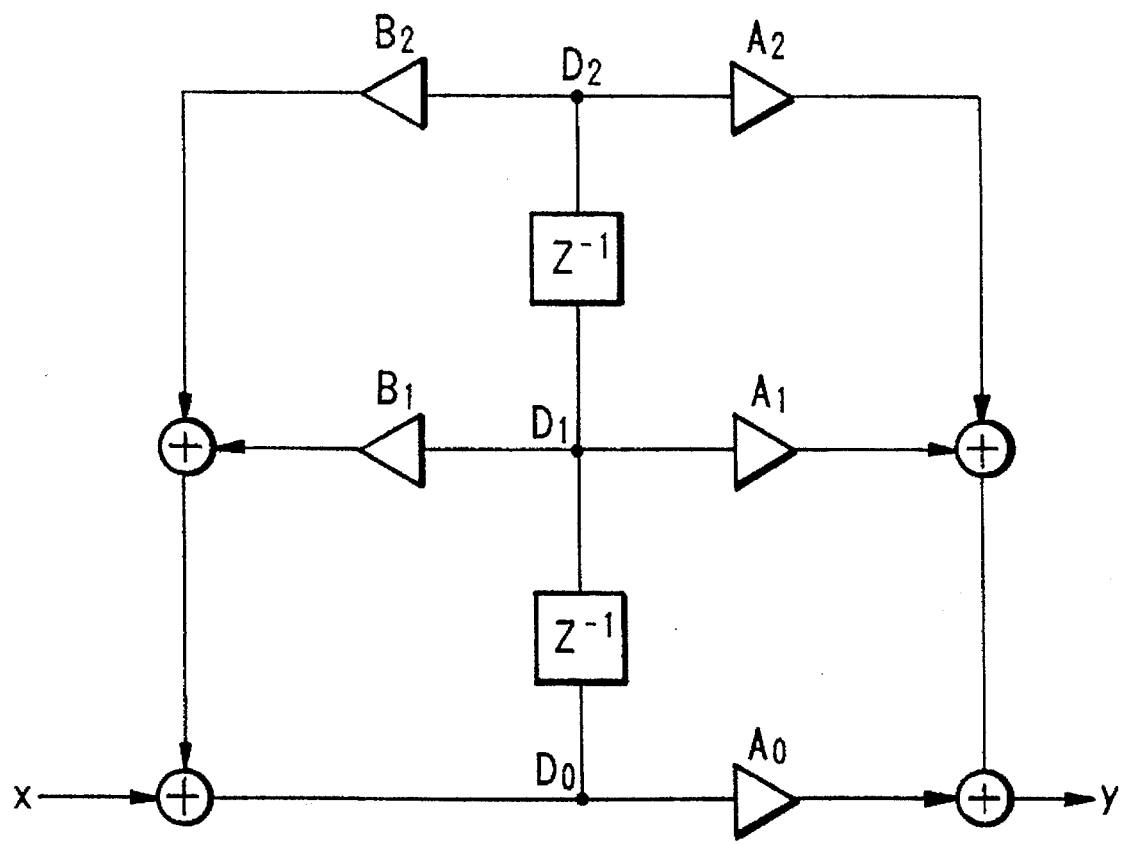
FIG. 3 is a circuit diagram showing an infinite-impulse response filter.
Figure 4:
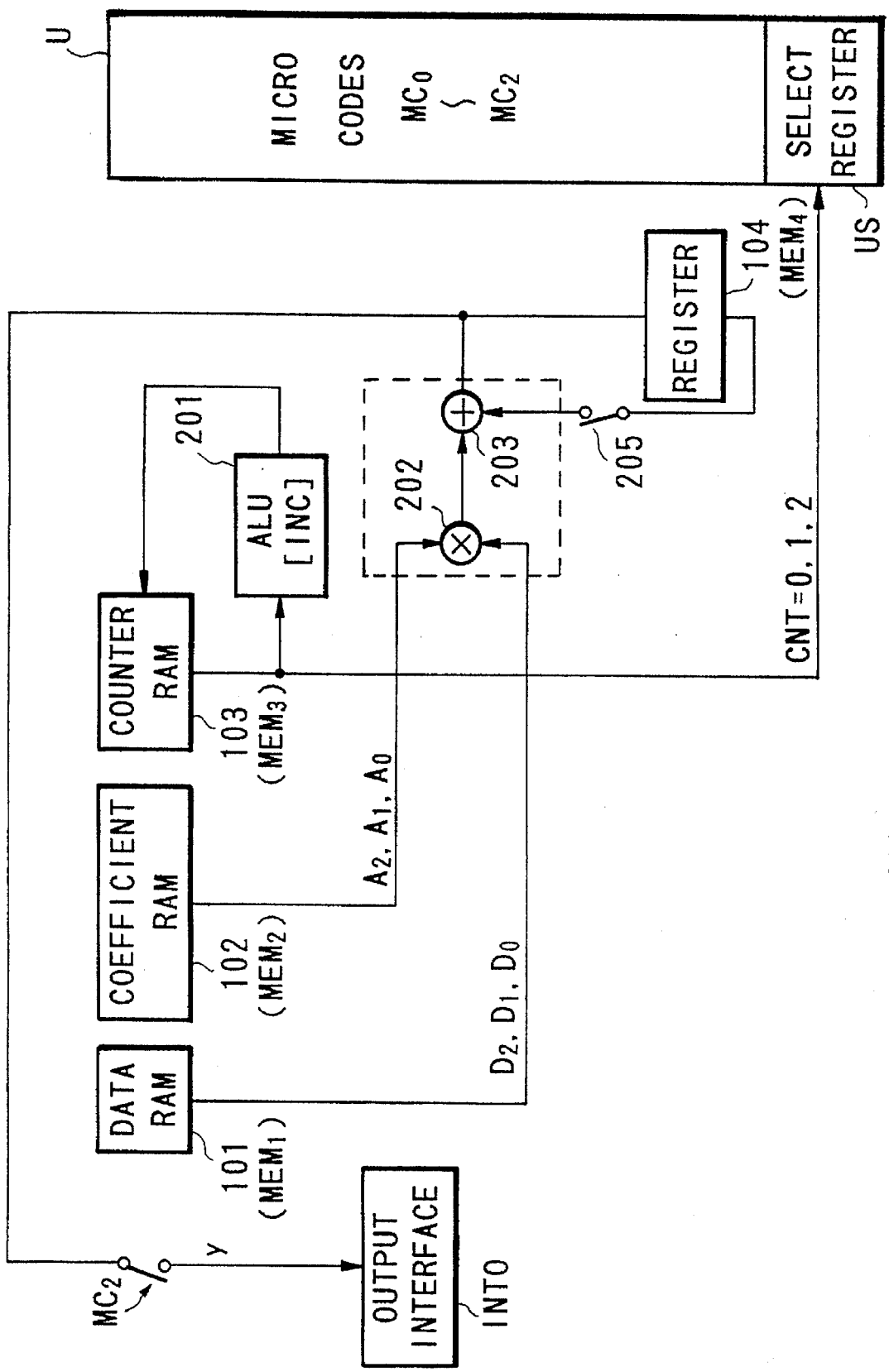
FIG. 4 is a block diagram showing a first example of an interconnection manner of the digital signal processor.
Figure 5:
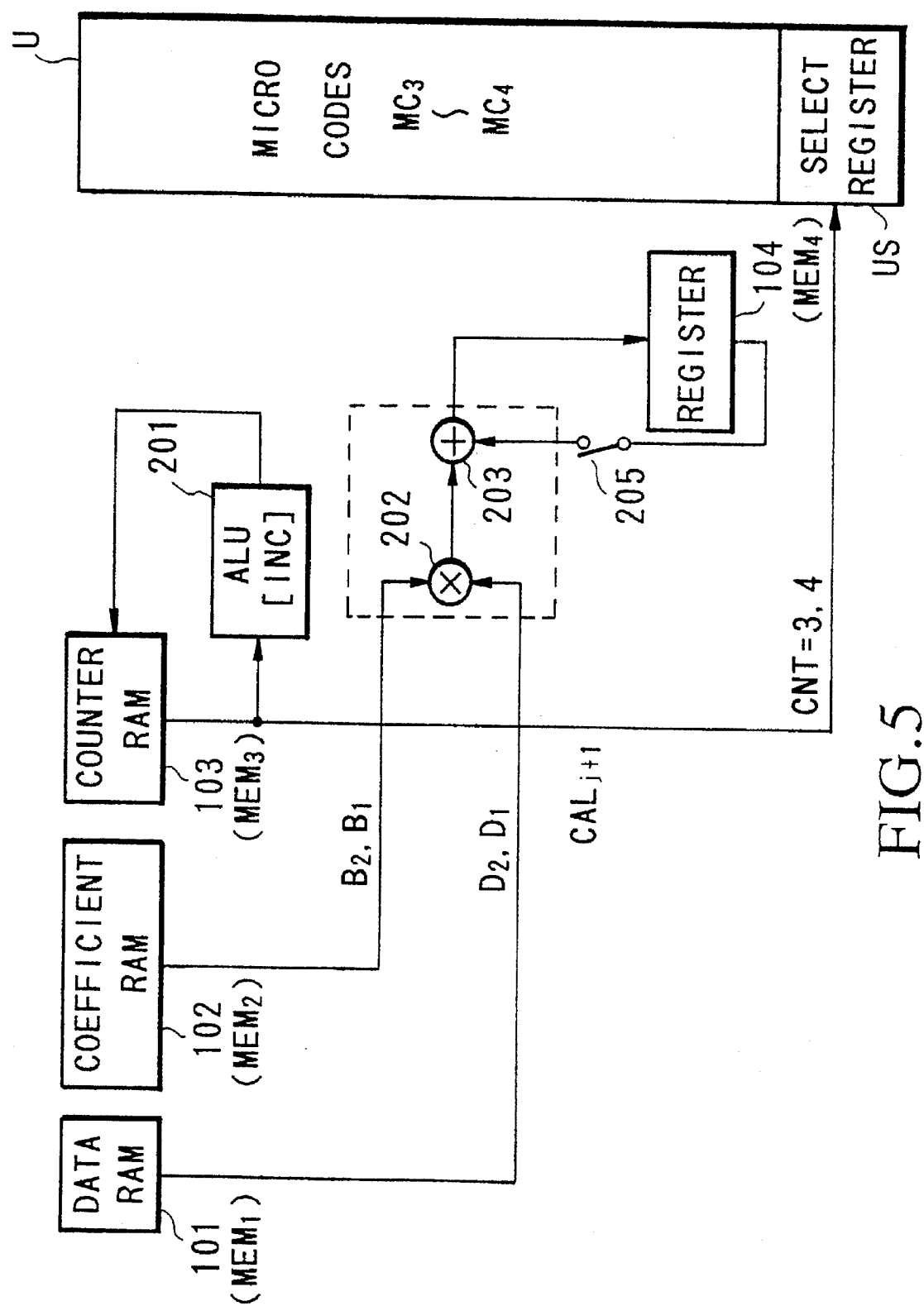
FIG. 5 is a block diagram showing a second example of an interconnection manner of the digital signal processor.
Figure 6:
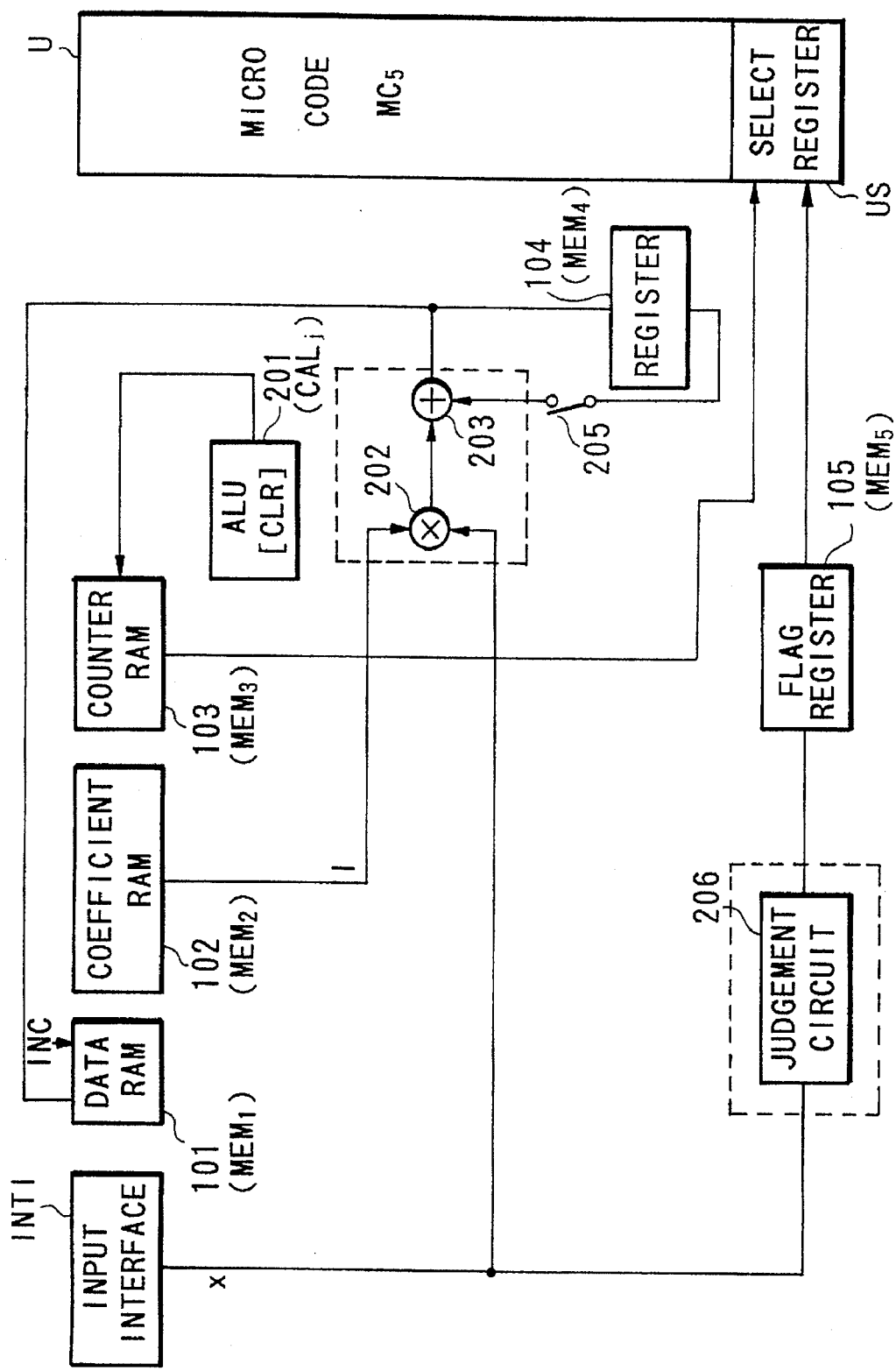
FIG. 6 is a block diagram showing a third example of an interconnection manner of the digital signal processor.

Next, the operations of the DSP will be described by referring to FIG. 3. FIG. 3 shows a circuit which is designed to perform an infinite-impulse response (IIR) filtering operation. Such IIR filtering operation is carried out by repeatedly carrying out a series of micro codes MC0 to MC5 in the DSP. Each of FIGS. 4 to 6 shows a transition state for the interconnection manner of the internal circuits of the DSP. The interconnection manner of the DSP is changed over in response to the micro codes MC0 to MC5. For convenience' sake, several kinds of circuits (e.g., input switching circuits, output switching circuits, input data buses and output data buses) are omitted in FIGS. 4 to 6.

In FIGS. 4 to 6, the memory portions MEM1 to MEM5 are respectively used as a data RAM 101, a coefficient RAM 102, a counter RAM 103, a register 104 and a flag register 105, while memory portions MEMg and MEMh are respectively used as an input interface INTI and an output interface INTO. Herein, the data RAM 101 stores intermediate operational results D0, D1, D2 which are obtained while performing the signal processing for the IIR filtering operation. The coefficient RAM 102 stores multiplication coefficients A0, A1, A2, B1, B2 in advance, wherein these coefficients are used for the IIR filtering operation. The counter RAM 103 is used for controlling a production of the micro code. Accompanied with an execution of the micro code, the stored contents of the counter RAM 103 is renewed.

Moreover, a judgement circuit 206 and other operation circuits such as an ALU 201, a multiplier 202, an adder 203 and a switch 205 are embodied by the aforementioned operating elements provided in the parallel-processing unit PCAL.

[B] Processing of Micro Code

Next, the processing of the micro code will be described in detail by describing the execution and the contents of each micro code.

(1) Micro Code MC0

(a) Execution

When a counter value CNT outputted from the counter RAM 103 (i.e., memory portion MEM3) becomes equal to "0", the micro-code RAM U outputs the micro code MC0 containing the control information consisting of plural control elements which are listed below. The reason why the micro code MC0 is produced as described above will be described later.

(b) Contents of MC0

The control elements included in the micro code MC0 will be listed as follows.

Input select information SLI1, representing the data-input-disable instruction. Thus, no data is supplied to and written in the memory portion MEM1 (i.e., data RAM 101).

Input address IAi: "invalid", indicating that IA1 is set at "0".

Reset signal RES1: "negate", indicating that the module counter 12 is reset.

Increment signal INC1: "negate", indicating that the count value of the module counter 12 is not incremented.

Output select information SLO1, designating an interconnection instruction by which an output terminal to read out the data of the memory portion MEM1 (i.e., data RAM 101) is interconnected to the input port of the parallel-processing unit PCAL corresponding to a first input terminal of a multiplier 202 provided in the parallel-processing unit PCAL.

Output address OA1, wherein a value k corresponding to a storage address of the signal value D0 used in the IIR filtering operation shown in FIG. 3 is produced as the output address OA1. In the memory portion MEM1, the output address OA1 is added with a count value M of the module counter 12 to produce a read-out address M+k, which is supplied to the dual port RAM 11 so that the signal value D0 is read out.

Input select information SLI2, representing a data-input-disable instruction. Thus, no data is supplied to and written in the memory portion MEM2 (i.e., coefficient RAM 102).

Input address IA2: invalid.

Reset signal RES2: "assert", indicating that the module counter provided in the memory portion MEM2 is reset.

Increment signal INC2: negate.

Output select information SLO2, designating an interconnection instruction by which an output terminal to read out the data of the memory portion MEM2 (i.e., coefficient RAM 102) is interconnected with the input port of the parallel-processing unit PCAL corresponding to a second input terminal of the multiplier 202.

Output address OA2, wherein a storage address "0" of the coefficient A0 used for the IIR filtering operation shown in FIG. 3 is produced as the output address OA2.

Input select information SLI3, designating an interconnection instruction to connect with one of the output data buses which corresponds to an output terminal of the ALU 201 provided in the parallel-processing unit PCAL.

Input address IA3, wherein an address "0" outputted as the input address IA3 in order to store the counter value CNT.

Reset signal RES3: assert.

Increment signal INC3: negate.

Output select information SLO3, designating an interconnection instruction by which the count value CNT to be read from the memory portion MEM3 (i.e., counter RAM 103) is controlled to be inputted into both of the select register US and ALU 201 provided in the parallel-processing unit PCAL.

Output address OA3="0".

Input select information SLI4, which instructs the input switching circuit to input the output data of the adder 203 provided in the parallel-processing unit PCAL.

Input address IA4="0".

Reset signal RES4: assert.

Increment signal INC4: negate.

Output select information SLO4, designating an output-disable instruction. Thus, in the circuitry shown in FIG. 4, a switch is opened, so that the data read from the memory portion MEM4 is not delivered to any other portions.

Output address OA4: invalid.

Input select information SLI5, designating a data-input-disable instruction.

Input address IA5: invalid.

Reset signal RES5: assert.

Increment signal INC5: negate.

Output select information SLO5, designating an output-disable instruction.

Output address: invalid.

Now, when the micro code MC0 of which contents are listed above is produced, the internal connection of the DSP is changed as shown in FIG. 4. However, at a moment when the micro code MC0 is produced, the output interface INT0 is not connected to the circuitry shown in FIG. 4. Then, the signal value D0 is read from an address k+M of the data RAM 101 (i.e., memory portion MEM1), while the coefficient A0 is read from an address 0 of the coefficient RAM 102 (i.e., memory portion MEM2). They are supplied to the multiplier 202 in the parallel-processing unit PCAL. On the other hand, a value "0" is read from an address 0 of the counter RAM 103 (i.e., memory portion MEM3) as the count value CNT. Incidentally, the reason why the count value CNT is set at "0" will be described later. As a result, the multiplier 202 produces a multiplication result "A0*D0", which is supplied to the first input terminal of the adder 203. On the other hand, a data value "0" is given at the second input terminal of the adder 203. Then, an incrementing operation is performed on the count value CNT="0" in the ALU 201, from which an operational result "1" is produced.

Thereafter, a write clock is supplied to each of the memory portions MEM1 to MEMn. As a result, the addition result A0*D0 outputted from the adder 203 is written at an address 0 of the register 104 (i.e., memory portion MEM4), while the operational result "1" outputted from the ALU 201 is written at an address 0 of the counter RAM 103 (i.e., memory portion MEM3). Thus, the count value CNT becomes equal to "1".

(2) Micro Code MC1

(a) Execution

When the count value CNT="1" is supplied to the select register US, the micro code MC1 of which contents are listed below is read from the micro-code RAM U.

(b) Contents of MC1

Output address OA1, wherein a value k−1 is produced as the output address OA1.

Output address OA2, wherein a storage address "1" provided for the coefficient A1 used for the IIR filtering operation shown in FIG. 3 is produced as the output address OA2.

Output select information SLO4, designating an instruction by which the data read from the memory portion MEM4 (i.e., register 104) is supplied to the second input terminal of the adder 203 provided in the parallel-processing unit PCAL.

Incidentally, the other pieces of the control information provided for the micro code MC1 are identical to those of the micro code MC0, hence, a detailed description thereof will be omitted.

Now, when the above-mentioned micro code MC1 is produced, the switch 205 shown in FIG. 4 is closed. Since the output address OA1 having a value k−1 is given, the signal value D1 is read from an address k+M−1 of the data RAM 101, and then, the signal value D1 is supplied to a first input terminal of the multiplier 202. As compared to the foregoing signal value D0, the signal value D1 is previously written in the data RAM 101 at a moment which was one sampling period prior to a writing moment of the signal value D0. Meanwhile, the coefficient A1 is read from an address 1 of the coefficient RAM 102, so that the coefficient A1 is supplied to a second input terminal of the multiplier 202. As a result, the multiplier 202 outputs an multiplication result A1*D1. In the adder 203, this data A1*D1 is added to the data A0*D0 outputted from the register 104. On the other hand, the ALU 201 increments the count value CNT="1" outputted from the counter RAM 103. Thus, an incremented value "2" is returned to the counter RAM 103.

Thereafter, a write clock is delivered to each of the memory portions MEM1 to MEMn. As a result, an addition result "A0*D0+A1*D1" outputted from the adder 203 is written into the register 104, while an output data "2" of the ALU 201 is written into the counter RAM 103, so that the count value CNT becomes equal to "2".

(3) Micro Code MC2
(a) Execution

When the count value CNT becomes equal to "2", the micro code MC2 containing the control information of which contents are listed below is read from the micro-code RAM U.

(b) Contents of MC2

Output address OA1, wherein a value k−2 is produced as the output address OA1.

Output address OA2, wherein a storage address "2" provided for the coefficient A2 used for the IIR filtering operation shown in FIG. 3 is produced as the output address OA2.

Output select information SLOh, designating an interconnection instruction by which the output data bus corresponding to an output terminal of the adder 203 is connected with a memory portion MEMh used as the output interface.

Incidentally, the other pieces of the control information are identical to those of the micro code MC1, hence, a detailed description thereof will be omitted.

Now, when the micro code MC2 is produced, the following operations are sequentially carried out. At first, the signal value D2 is read from an address M+k−2 of the data RAM 101, while the coefficient A2 is read from an address 2 of the coefficient RAM 102, so that the multiplier 202 outputs a multiplication result A2*D2. As compared to the signal value D0, the signal value D2 is previously written in the data RAM 101 at a moment which was two sampling periods prior to a writing moment of the signal value D0. In the adder 203, the data "A2*D2" is added with the data "A0*D0+A1*D1" outputted from the register 104. On the other hand, the ALU 201 increments the count value CNT= "2" outputted from the counter RAM 103. Then, an incremented value "3" is returned to the counter RAM 103.

Thereafter, a write clock is delivered to each of the memory portions, so that data "A0*D0+A1*D1+A2*D2" outputted from the adder 203 is written into the register 104. In addition, data "3" outputted from the ALU 201 is written into the counter RAM 103, thus, the count value CNT becomes equal to "3".

As described heretofore, by executing the operations respectively designated by the micro codes MC0 to MC2, a part of the signal processing (indicated by a circuit portion which is shown at a right side from delay elements "$Z^{-1}$" in FIG. 3) is completed.

(4) Micro Code MC3
(a) Execution

When the count value CNT becomes equal to "3", the micro code MC3 containing the control information of which contents are listed below is read from the micro-code RAM U, resulting that an interconnection state of the DSP is changed shown in FIG. 5.

(b) Contents of MC3

Output address OA1, wherein a value k−1 is produced as the output address OA1.

Output address OA2, a storage address "3" for the coefficient B1 of the IIR filtering operation shown in FIG. 3 is produced as the output address OA2.

Output select information SLO4, designating an output-disable instruction. Thus, the data read from the register 104 (i.e., memory portion MEM4) is not supplied to any portion in the circuitry, while the switch 205 shown in FIG. 5 is opened.

Output select information SLOh: disable. Thus, the output interface INT0 is disconnected with the parallel-processing unit PCAL.

Incidentally, the other pieces of the control information are identical to those of the micro code MC2, hence, the detailed description thereof will be omitted.

Now, when the micro code MC3 is produced, the signal value D1 is read from an address k−1 of the data RAM 101, while the coefficient B1 is read from an address 3 of the coefficient RAM 102, resulting that the multiplier 202 produces a multiplication result "B1*D1". Such multiplication result "B1*D1" is supplied to the first input terminal of the adder 203. Since the switch 205 is opened, a signal value applied to the second input terminal of the adder 203 becomes equal to "0". Hence, an addition result "B1*D1" is outputted from the adder 203. Meanwhile, the ALU 201 increments the count value CNT="3" outputted from the counter RAM 103, and consequently, an incremented value "4" is supplied to the counter RAM 103.

Thereafter, a write clock is produced, so that the data "B1*D1" outputted from the adder 203 is written into the register 104, while the data "4" outputted from the ALU 201 is written into the counter RAM 103. Thus, the count value CNT becomes equal to "4".

(5) Micro Code MC4
(a) Execution

When the count value CNT becomes equal to "4", the micro code MC4 containing the control information of which contents are listed below is read from the micro-code RAM U.

(b) Contents of MC4

Output address OA1, wherein a value k−2 is produced as the output address OA1.

Output address OA2, wherein a storage address 4 for the coefficient B2 used for the IIR filtering operation shown in FIG. 3 is produced as the output address OA2.

Output select information SLO4, designating an instruction by which the data read from the memory portion MEM4

(i.e., register 104) is delivered to the adder 203 provided in the parallel-processing unit PCAL. Thus, the switch 205 shown in FIG. 5 is set in an ON state.

Incidentally, the other pieces of the control information are identical to those of the micro code MC3, hence, the description thereof will be omitted.

Now, when the micro code MC4 is produced, the signal value D2 is read from an address M+k−2 of the data RAM 101, while the coefficient B2 is read from an address 4 of the coefficient RAM 102. As a result, the multiplier 202 produces a multiplication result "B2*D2". Then, the adder 203 adds the multiplication result "B2*D2" of the multiplier 202 with the output data "B1*D1" of the register 104, resulting that the adder 203 outputs an addition result of "B1*D1+B2*D2". Meanwhile, the ALU 201 increments the count value CNT="4" outputted from the counter RAM 103. Then, the incremented value "5" is supplied to the counter RAM 103.

Thereafter, a write clock is produced, and consequently, the above-mentioned addition result "B1*D1+B2*D2" is written into the register 104, while the output data "5" of the ALU 201 is written into the counter RAM 103. Thus, the count value CNT becomes equal to "5".

(6) Micro Code MC5
(a) Execution

When the count value CNT turns to "5", the micro code MC5 containing the control information of which contents are listed below is read from the micro-code RAM U. Hence, an interconnection state of the DSP is changed as shown in FIG. 6.

(b) Contents of MC5

Increment signal INC1: assert.

Input address IA1, wherein a value k is produced as the input address IA1.

Output select information SLO1, designating an output-disable instruction. Thus, the data read from the memory portion MEM1 (i.e., data RAM 101) is not supplied to any other portions in the circuitry shown in FIG. 6.

Output address OA1: invalid.

Output address OA2, wherein a value "5" designating an address at which a constant "1" is stored is produced as the output address OA2.

Output select information SLO3, designating an instruction by which the count value CNT to be outputted from the memory portion MEM3 (i.e., counter RAM 103) is delivered to the select register US. Thus, a supply of the input data to be supplied to the ALU 201 is stopped, so that the output of the ALU 201 is set at "0".

Input select information SLIg, designating an instruction by which the output of the memory portion MEMg which is used as the input interface INTI is supplied to the multiplier 202 and the judgement circuit which are provided in the parallel-processing unit PCAL.

Input select information SLI5, designating an instruction by which the output of the judgement circuit provided in the parallel-processing unit PCAL is selected as the data to be supplied to the memory portion MEM5 (i.e., flag register 105).

Input address IA5="0".
Output address OA5="0".

Output select information SLO5, designating an instruction by which the output of the memory portion MEM5 (i.e., flag register 105) is selected as the data to be applied to a preset terminal of the select register US.

Incidentally, the other pieces of the control information are identical to those of the micro code MC4, hence, the description thereof will be omitted.

Now, when the micro code MC5 is produced, the increment signal INC1 is asserted, and consequently, the count value of the module counter 12 in the memory portion MEM1 (i.e., data RAM 101) becomes equal to "M+1", so that the DSP prepares for a new sampling period to come. More specifically, storage addresses at which the signal values D0, D1 and D2 are respectively stored are turned to "M+k+1", "M+k" and "M+k−1" respectively. Thus, the signal values D0 and D1, which are respectively stored at addresses M+k and M+k−1 in a preceding sampling period, are treated as the signal values D1 and D2 in the new sampling period.

Then, a new sample of digital signal "X" is entered into the DSP by means of the input interface INTI. The multiplier 202 performs a multiplication operation on the sample X and the data "1" which is read from an address 4 of the coefficient RAM 102. A multiplication result "X" of the multiplier 202 and the output data "B1*D1+B2*D2" of the register 104 are supplied to the adder 203, from which an addition result "X+B1*D1+B2*D2" is outputted.

In the meantime, the sample X is also delivered to the judgement circuit in the parallel-processing unit PCAL. Then, the judgement circuit judges whether or not the value X is equal to or larger than a predetermined value. If so, a value "1" is written into the flag register 105 as the flag information. If not (in other words, if the value X is smaller than the predetermined value), a value "0" is written into the flag register 105. Since no data is applied to the input terminal of the ALU 201, the output of the ALU 201 is remained at "0".

Thereafter, a write clock is produced, so that the output data of "X+B1*D1+B2*D2" which is outputted from the adder 203 is written into the data RAM 101 at an address M+1+k as the signal value D0. Thus, the whole operation process which corresponds to one sampling period of the IIR filtering operation shown in FIG. 3 is completely carried out.

Moreover, the output data "0" off the ALU 201 is written into the counter RAM 103, so that the count value becomes equal to "0".

The select register US receives the count value CNT="0" (which is outputted from the counter RAM 103) and the flag information (which is outputted from the flag register 105). In the case where a value of the flag information is equal to "0" because a value of the new sample is smaller than the predetermined value, the count value CNT="0" is written into the select register US. As a result, the aforementioned micro code MC0 is produced, resulting that the interconnection state of the DSP is changed back as shown in FIG. 4. Then, the IIR filtering operation is carried out again with respect to the new sampling period in accordance with the operating procedure which is described heretofore.

Figure 7:
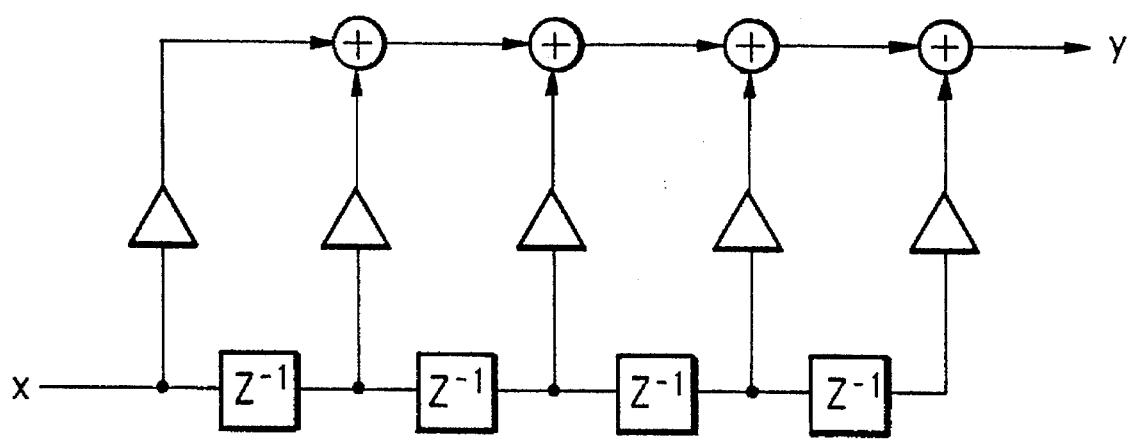
FIG. 7 is a circuit diagram showing a finite-impulse response filter.

On the other hand, when the value of the flag information becomes equal to "1" because the sample X becomes equal to or larger than the predetermined value, a value which is determined in advance and is selected from a group of the values other than the values "0" to "5" is preset to the select register US. As a result, the micro-code RAM U outputs a certain micro code which will embody a connection state (see FIG. 7) suitable for performing a finite-impulse response filtering operation (i.e., FIR filtering operation). In short, it is possible to change the interconnection manner of the DSP in response to the micro code to be produced. In other words, a decision branching in the algorithm of the parallel processing can be performed by changing the micro code on the basis of the operational result. The reason why the DSP according to the present invention can produce the micro code which embodies the FIR filtering operation by changing the interconnection manner of the DSP can be easily understood from the description of the preferred embodiment in which the IIR filtering operation is embodied.

Figure 8:
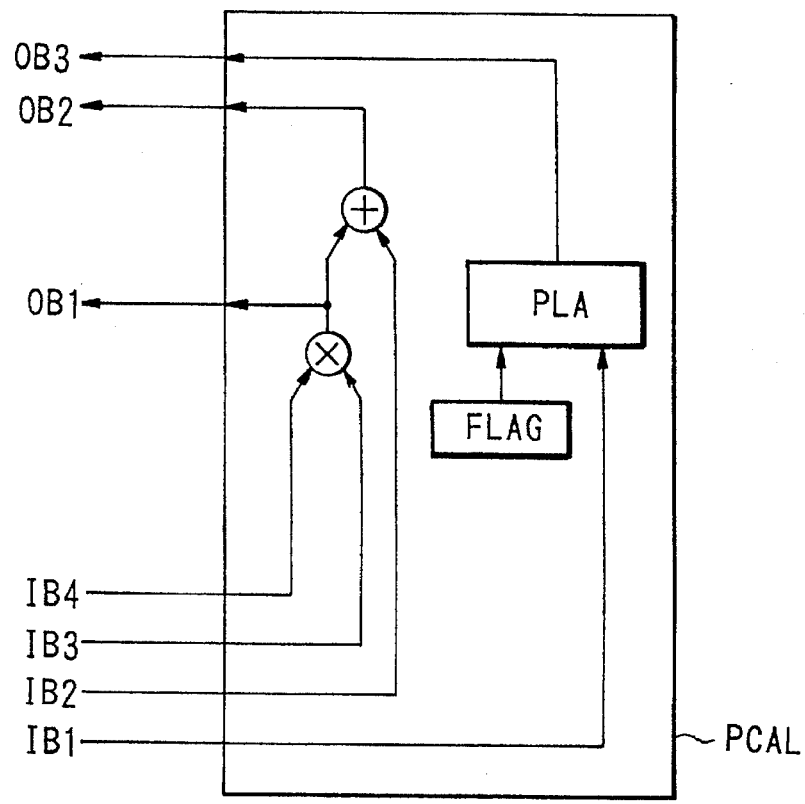
FIG. 8 is a block diagram showing a second example of the parallel-processing unit.
Figure 9:
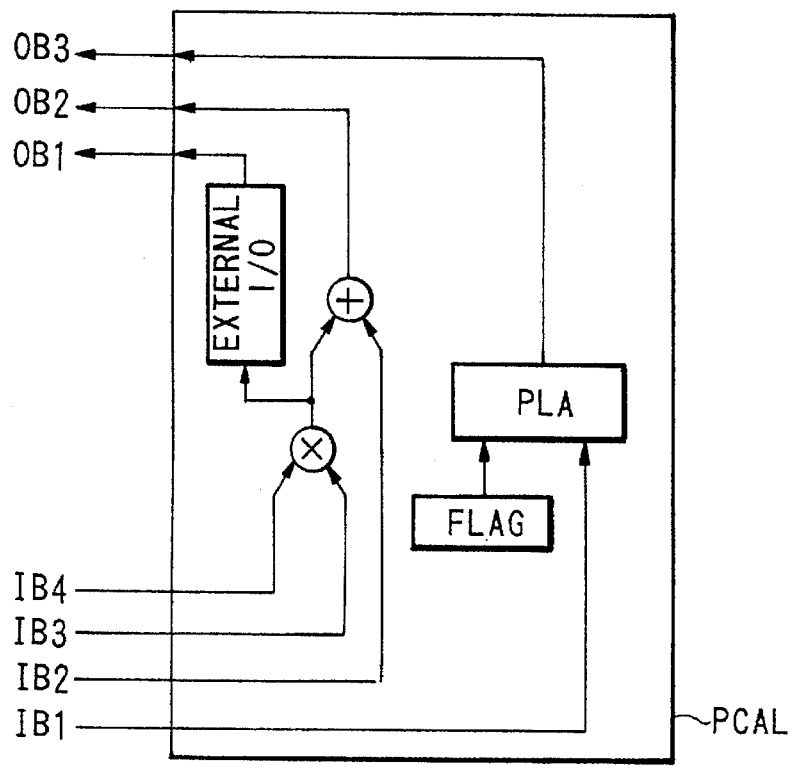
FIG. 9 is a block diagram showing a third example of the parallel-processing unit.

Next, other examples of the parallel-processing units PCAL will be described. The aforementioned first example of the parallel-processing unit PCAL provides three independent blocks, wherein a first block contains a pair of the adder and multiplier, a second block contains the programmable logic array (PLA) and a third block contains the external I/O portion. The connection with one of or some of the input data buses IB1 to IB5 and the output data buses OB1 to OB5 is fixed with respect to each of the three blocks. Such structure of the parallel-processing unit PCAL is advantageous in that a number of circuits required can be reduced. However, it lacks a degree of freedom in the circuit design because each block is fixedly connected with the predetermined buses. In order to improve the degree of freedom in the circuit design, the parallel-processing unit PCAL can be configured as one block as shown in FIGS. 8 or 9. This PCAL is connected with the predetermined buses, i.e., the input data buses IB1 to IB4 and the output data buses OB1 to OB3. However, it is possible to freely change an interconnection among the circuit elements in the parallel-processing unit PCAL. In other words, the interconnection of the parallel-processing unit PCAL can be changed to the circuitry shown in FIG. 8 or the circuitry shown in FIG. 9 by changing the programs. In this case, a change of the interconnection of the parallel-processing unit PCAL can be instructed by the micro code given from an external device.

Figure 10:
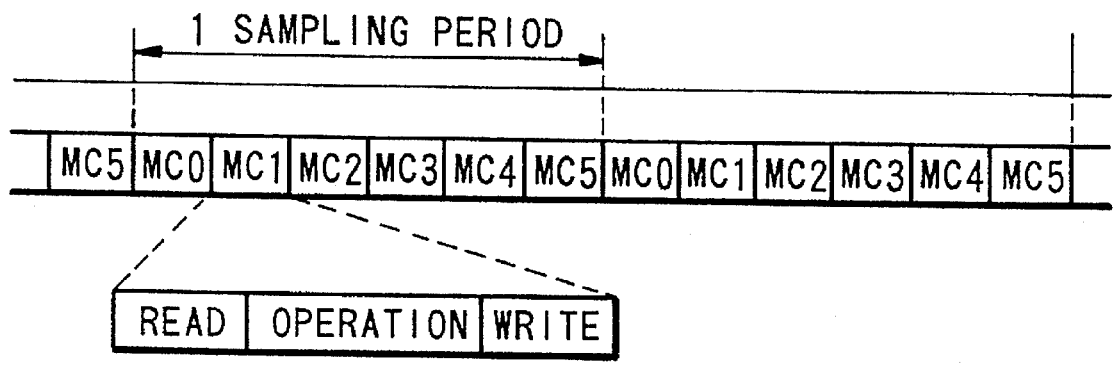
FIG. 10 is a time chart employed for the digital signal processor.

FIG. 10 is a time chart employed for the digital signal processor. Each of the circuit configurations shown in FIGS. 4, 5 and 6 is formed in one sampling period. In one sampling period, the micro codes MC0 to MC5 are produced from the micro-code RAM U. Every time one of the micro codes is produced, a set of the reading, data operation and writing is carried out. The whole operation of the DSP is controlled by a central processing unit (i.e., CPU, not shown) externally provided.

Figure 11:
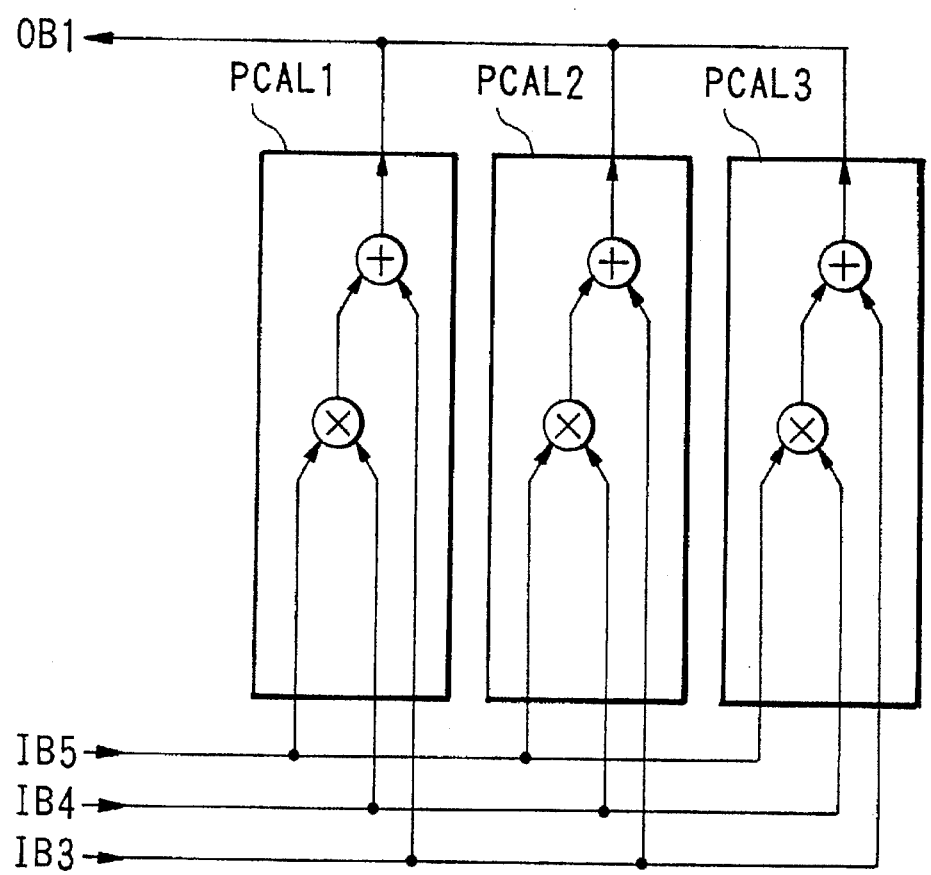
FIG. 11 is a block diagram showing a fourth example of the parallel-processing unit.

In an example shown in FIG. 11, a plurality of parallel-processing blocks PCAL1, PCAL2 and PCAL3 are connected in parallel. In FIG. 11, the illustration of the PLA and the external I/O portion is omitted. In this example of the parallel-processing unit PCAL, each of the parallel-processing blocks corresponds to the aforementioned first block, containing a pair of the adder and multiplier, provided in the foregoing parallel-processing unit PCAL, shown in FIG. 2. In this example, it is possible to independently drive each of the parallel-processing blocks so that each parallel-processing block can perform a specified operation. Thus, it is possible to improve a performability in the data processing of the DSP.

Lastly, this invention may be practiced or embodied in still other ways without departing from the spirit or essential character thereof as described heretofore. Therefore, the preferred embodiment described herein is illustrative and not restrictive, the scope of the invention being indicated by the appended claims and all variations which come within the meaning of the claims are intended to be embraced therein.

What is claimed is:

1. A digital signal processor comprising:
   a plurality of first data buses;
   a plurality of second data buses;
   a plurality of operating means each of which performs a predetermined operation on data inputted thereto so as to carry out a parallel processing on input data as a whole, the plurality of operating means receiving input data from the first data buses and supplying operational results as output data to the second data buses;
   a plurality of memory means for storing data received from the second data buses and for supplying data to the first data buses;
   a plurality of first selector means, each first selector means being connected between an output of one of the memory means and the plurality of first data buses for allowing the output of the memory means to be selectively coupled to one or more of the first data buses so as to supply output data from the memory means to a desired one or more of said operating means as said input data, the plurality of first selector means operating in accordance with first select information;
   a plurality of second selector means, each second selector means being connected between an input of one of the memory means and the plurality of second data buses for allowing the input of the memory means to be selectively coupled to one or more of the second data buses so as to supply desired output data from said operating means to the input of said memory means, the plurality of second selector means operating in accordance with second select information; and
   a micro code read/write memory (RAM) for storing a plurality of micro code instructions, each of said micro code instructions containing control data including said first select information, said second select information, and a plurality of writing addresses and a plurality of reading addresses for said plurality of memory means, wherein
   said micro code RAM supplies respective portions of the control data from a selected micro code instruction to said plurality of first selector means, said plurality of second selector means, and said plurality of memory means,
   said micro code RAM selects micro code instructions in response to a signal generated within said digital signal processor, and
   the plurality of micro code instructions stored in said micro code RAM can be added to, altered, and deleted from so as to provide a different plurality of micro code instructions containing different control data, to change couplings between the operating means and the memory means by changing contents of the micro code RAM.

2. The digital signal processor as defined in claim 1, wherein said micro code RAM selects micro code instructions in response to a particular operational restfit outputted from at least one of said operating means.

3. The digital signal processor as defined in claim 1, wherein said operating means is configured to include an arithmetic and logic unit (ALU).

4. The digital signal processor as defined in claim 1, wherein said operating means is configured to include a programmable logic array.

5. The digital signal processor as defined in claim 1, wherein said operating means is configured to include an arithmetic and logic unit and a programmable logic array.

6. The digital signal processor as defined in claim 1, wherein said micro code RAM comprises a micro code instruction storing portion and a selecting means, said micro-code instruction storing portion storing a plurality of micro code instructions, while said selecting means selects one of said plurality of micro codes in response to said signal generated within said digital signal processor.

7. A digital signal processor comprising:

a parallel-processing unit containing a plurality of operating elements, each of which performs a predetermined operation on data inputted thereto so as to carry out a parallel processing on input data as a whole;

a plurality of memory portions for storing operational results obtained from said operating elements;

a plurality of output means, each of said output means operating to selectively read out data from a desired one of said memory portions so as to output it to a desired one or more of said operating elements in accordance with output select information;

a plurality of input means, each of said input means operating to selectively supply the operational restfit outputted from a desired one of said operating elements to a desired one or more of said memory portions in accordance with input select information;

a micro code read/write memory (RAM) for storing a plurality of micro codes, said micro codes containing said input select information, said output select information, and writing addresses and reading addresses for said plurality of memory portions, said micro code memory being coupled to provide at least one micro code to said output means, to said input means and said plurality of memory portions; and a micro code selecting means for selecting one of said micro codes from said micro code RAM so as to output a selected micro code in response to a particular operational result obtained from said operating elements, wherein said plurality of operating elements in said parallel-processing unit are coupled with each other and with said plurality of memory portions in response to said micro code provided by said micro code memory so as to form a first specific circuit configuration suitable for performing a specified parallel processing operation, and the plurality of micro code instructions stored in said micro code RAM can be changed to provide a different plurality of micro code instructions, to change couplings between said plurality of operating elements and said plurality of memory portions so as to form a second specific circuit configuration different from the first specific circuit configuration.

* * * * *